United States Patent [19]

Carlson

[11] Patent Number: 4,645,268
[45] Date of Patent: Feb. 24, 1987

[54] CAST METAL WHEEL COVER

[75] Inventor: Kenneth H. Carlson, Clawson, Mich.

[73] Assignee: Chrysler Motors Corporation, Highland Park, Mich.

[21] Appl. No.: 810,619

[22] Filed: Dec. 19, 1985

[51] Int. Cl.$^4$ .............................................. B60B 7/02
[52] U.S. Cl. ..................................... 301/37 S; 301/65; D12/206/211
[58] Field of Search ............ D12/206, 211; 301/37 R, 301/37 S, 37 SS, 37 P, 63 R, 63 PW, 63 DD, 63 DS, 65

[56] References Cited

U.S. PATENT DOCUMENTS

| | | | |
|---|---|---|---|
| 3,016,269 | 1/1962 | DeLorean | 301/65 X |
| 3,153,557 | 10/1964 | O'Brien | 301/65 |
| 3,312,505 | 4/1967 | Hutchins | 301/37 SS |
| 4,286,824 | 9/1981 | Brown | 301/37 SS |
| 4,487,455 | 12/1984 | Nickoladze | 301/37 S X |

FOREIGN PATENT DOCUMENTS 1418627  12/1975  United Kingdom ................. 301/65

*Primary Examiner*—David A. Scherbel
*Attorney, Agent, or Firm*—Gerald P. Dundas

[57] ABSTRACT

A vehicle road wheel construction adaptable to provide a spoke or lace decorative appearance. The construction finds special application with cast metal wheels in which a first group of spokes or ribs are formed in the disc or spider portion of the wheel interlace with a second group of ribs or finger elements. This second group is part of an integral, one piece, cast metal cover which is detachably connected to the wheel.

3 Claims, 4 Drawing Figures

4,645,268

CAST METAL WHEEL COVER

FIELD OF THE INVENTION

This invention relates to vehicle road wheels and in particular to cast metal wheel structures having a decorative appearance. The invention has special application with respect to providing simulated spoke or lace patterns in cast metal wheels.

BACKGROUND OF THE INVENTION

There is an ever increasing demand for vehicle road wheels to personalize and customize an automobile. At the same time, it is desired to provide a wheel which offers a reduction in weight as compared with the standard steel wheels and also provides improved through the wheel ventilation for brake cooling. These demands have frequently been satisfied by wheels cast of magnesium or alluminum alloy. However, because of relative low resiliency, flexibility and brittleness problems associated with such cast metals, vehicle wheels fabricated therefrom are generally considerably more expensive than standard steel wheels.

In addition to difficulties associated with fabrication, there has long been a problem in providing cast metal wheels having an ornamental lace or wire spoke design. This problem resides in the fact that unfinished cast metal, that is, metal whose surface has not been plated or machined, is considered by most people as aesthetically unpleasing. A wire spoke or lace design, however, presents costly machining or plating operations as the surfaces to be plated or machined are not on a common or nearly common plane to be accessible to machine work such as polishing or grinding. Accordingly, the art, as commented on in U.S. Pat. Nos. 3,884,527 and 4,530,542, continues to experience difficulties in providing a reasonable cost cast metal wire or lace wheel.

SUMMARY OF THE INVENTION

It is an object of the present invention to provide a cast vehicle wheel having an ornamental outer side which is relatively inexpensive and easy to manufacture.

It is a particular object to provide a cast vehicle wheel having a simulated spoke, lace or latticework rib ornamental appearance.

The above and other objects of the invention are provided in a preferred embodiment in which an ornamental spoke or lace appearance is achieved through a two piece construction in which a decorative cover overlies a portion of the wheel disc. The wheel has a wheel center having a vehicle axle mounting hub and a radially extending disc which supports a tire receiving rim. A cover is detachably connected to the wheel disc and the cover and disc each have spoke or rib elements which are axially spaced and angularly inclined relative to each other to define diamond, triangular or rectangular openings through the wheel to provide for desired air circulation. The spoke portions of the disc and cover are separately machined to the desired appearance prior to the cover being attached to the wheel as it would be too costly to machine such surfaces which lie in different planes if they were cast as a one-piece homogeneous structure.

Other objects, features and advantages of the present invention will become more fully apparent from the following detailed description of the preferred embodiment, appended claims and accompanying drawings.

DESCRIPTION OF THE DRAWINGS

The features and advantages of the cast vehicle wheel construction of this invention are illustrated in the accompanying drawings wherein.

DESCRIPTION OF THE PREFERRED EMBODIMENT

Figure 1:
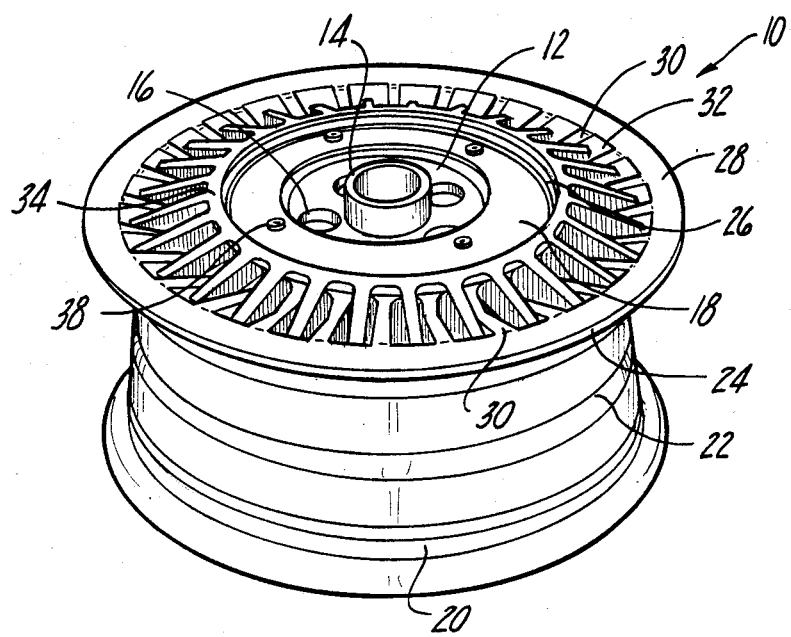
FIG. 1 is a perspective view of a vehicle wheel constructed according to this invention.

As seen with reference FIG. 1, the vehicle wheel of this invention 10 includes a center load supporting portion 12 having a mounting hub 14 and a plurality of holes 16 positioned to receives studs on a vehicle axle (not shown). The wheel is secured to the vehicle axle by positioning the mounting hub on the vehicle axle and fastening retaining nuts to the axle studs. A spider or disc 18 extends radially outward from the wheel center load support portion 12 and supports a rim 20 with a conventional drop center or well 22 and pair of tire bead retaining flanges 24 adapted for mounting a pneumatic tire thereon.

Figure 2:
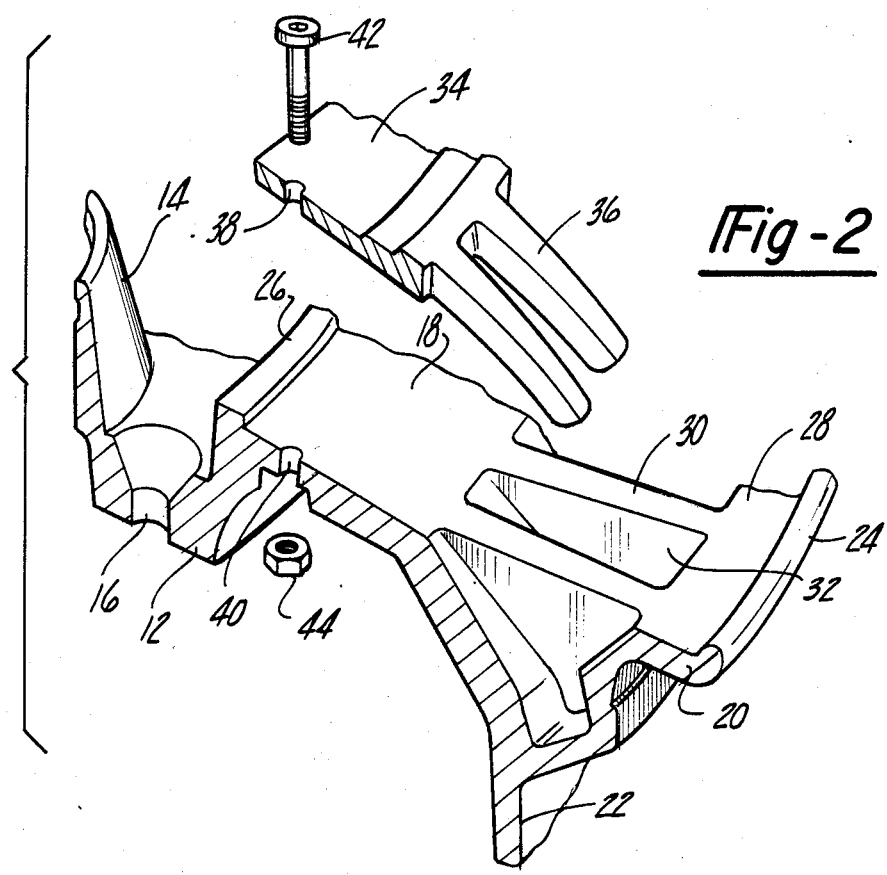
FIG. 2 illustrates a fragmentary perspective view of part of the wheel of FIG. 1 showing attachment means for connecting the cover to the wheel.

Disc 18 has, as seen with reference to FIG. 2, an inner hub end 26 and an outer rim end 28 which is joined to the rim 20. In the decorative lace embodiment shown in the drawings, an outer circumferential band of ribs or fingers 30 extend radially outward and join with the rim portion 20. Ribs 30 are circumferentially spaced from each other to provide apertures 32 extending through the wheel. These apertures form an axially open latticework which facilitates air passage through the wheel.

Figure 4:
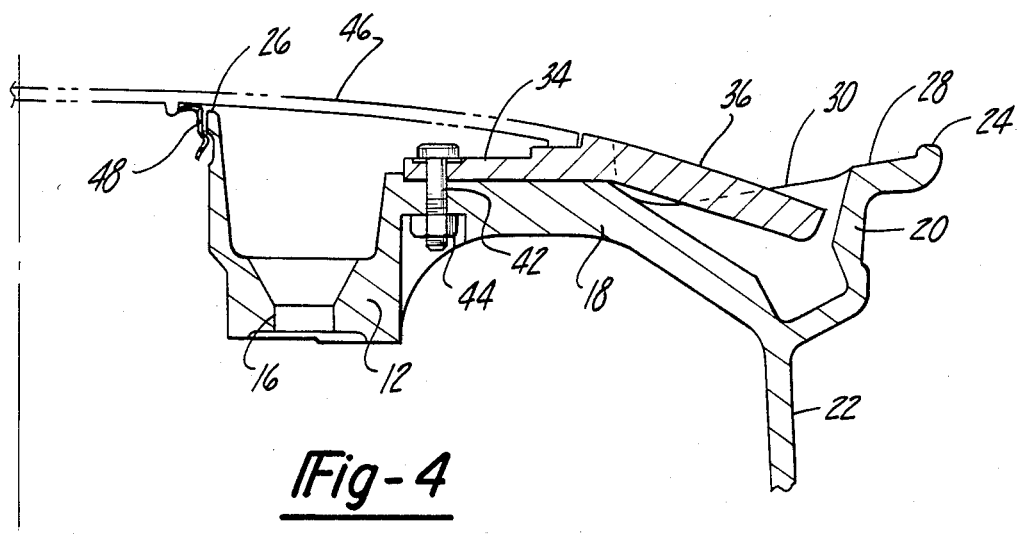
FIG. 4 is a sectional view taken as indicated by line 44 in FIG. 3.

A separate piece in the form of a cover or cap 34 overlies a portion of the disc 18 and is provided with circumferentially spaced arms 36 about its outer periphery. The cap is positioned, as seen with reference to FIGS. 2 and 4, such that cap arms 36 fit into the disc apertures 32. In a preferred embodiment, the disc ribs 28 and cap arms 34 are each at an angle with respect to each other and to a plane extending normal to the axis of the wheel. This creates an interesting laced appearance. The cap may be detachably connected to the wheel by any appropriate means.

Thus, the cap could be cemented to the axle studs which extend through holes 16 in the center load support position 12 of the wheel. In the embodiment illustrated in the drawings, the cap 34 and disc 18 are provided with aligned openings 38 and 40 through which threaded fasteners 42 may be received for securing the cap to the disc by nuts 44.

Figure 3:
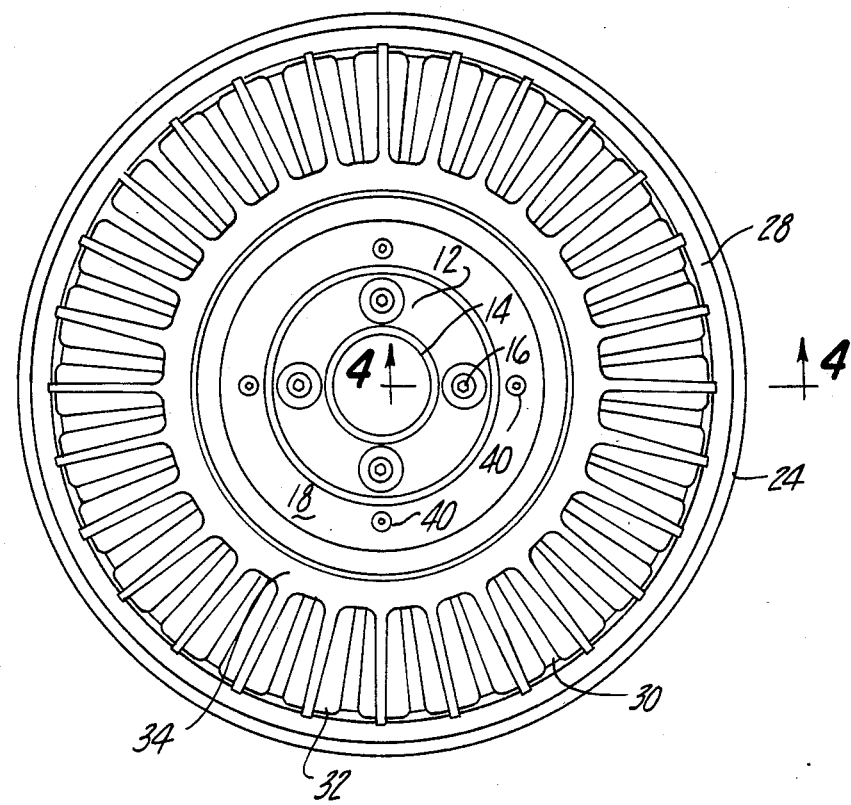
FIG. 3 is an axial, front, plan view of the wheel illustrated in FIG. 1.

The vehicle wheel of this invention is preferably composed of two pieces and cast from materials such as low/medium carbon steel, aluminum or magnesium. One wheel piece comprises the cap 34 and the second piece is the remainder of the wheel. As seen with reference to FIG. 3, the cap arms 36 and disc ribs 30 are alternately spaced and angularly inclined relative to each other so as to give an interlaced appearance. Because of this angular inclination, it would be most difficult to machine the outboard surfaces of ribs 30 and arms 36 to provide the bright, polished metallic appearance which is so often desired if the wheel 10 were fabricated as a one-piece homogeneous casting. As will be understood, such appearance is achieved by spinning the cast wheel about its axis and contacting the outer surface of the ribs 30 with a grinding tool. Due to the overlying position of the outer surface of cap arms 36, this polishing technique cannot be employed and other polishing techniques have proved to costly. Accordingly, laced or spoked cast wheels have not, prior to this invention, been available at a market acceptable cost.

If desired, an additional cover member 46 (see FIG. 4) can be employed to overlie the wheel center to conceal the mounting hub 14 and axle stud apparatus 16. The cover may be secured to the wheel center load supply portion by any suitable means such as fasteners 48 which engage the inside of the hub 14.

It will be apparent that the present invention provides a cast wheel whose decorative appearance, can be readily modified inexpensively provided. Modifications and other alternative constructions will be apparent which are within the spirit of the appended claims.

What is claimed is:

1. A vehicle wheel assembly having an ornamental outer side comprising:

a unitary cast metal wheel having a wheel center portion provided with a mounting hub having a central aperture and a plurality of stud holes for receiving the axle hub and mounting studs, respectively, of a vehicle's axle hub;

a rim adapted for mounting a pneumatic tire thereon and joined to said mounting hub by a disc positioned between and connected to said rim and said hub; said disc having radially extending circumferentially spaced apart ribs; and a unitary cast metal cap detachably connected to said disc and provided with radially extending circumferentially spaced apart arms which are positioned between and angularly inclined with respect to said ribs of said disc.

2. The wheel assembly as set forth in claim 1 where the radially outward portion of said ribs are connected with said wheel rim, said spaced apart ribs forming recesses at positions spaced angularly apart about the axis of rotation of the wheel and said arms of said disc projecting into said recesses.

3. The wheel assembly as set forth in claim 1 wherein the wheel assembly is a cast non-ferrous metal selected from the group consisting of aluminum, magnesium and alloys thereof.

* * * * *

UNITED STATES PATENT AND TRADEMARK OFFICE
CERTIFICATE OF CORRECTION

PATENT NO. : 4,645,268
DATED : February 24, 1987
INVENTOR(S) : Kenneth H. Carlson It is certified that error appears in the above-identified patent and that said Letters Patent are hereby corrected as shown below:

Title page, Item 75, change the inventor's name from "Kenneth H. Carlson" to --Kenneth L. Carlson--.

Signed and Sealed this

Twenty-sixth Day of July, 1988

Attest:

DONALD J. QUIGG

Attesting Officer

Commissioner of Patents and Trademarks